(12) United States Patent
Hung

(10) Patent No.: US 10,114,699 B2
(45) Date of Patent: Oct. 30, 2018

(54) RAID CONSISTENCY INITIALIZATION METHOD

(75) Inventor: Ching-Hai Hung, Taipei Hsien (TW)

(73) Assignee: Infortrend Technology, Inc., New Taipei (TW)

( * ) Notice: Subject to any disclaimer, the term of this patent is extended or adjusted under 35 U.S.C. 154(b) by 236 days.

(21) Appl. No.: 10/711,816

(22) Filed: Oct. 7, 2004

(65) Prior Publication Data

US 2005/0076260 A1 Apr. 7, 2005

Related U.S. Application Data

(60) Provisional application No. 60/481,476, filed on Oct. 7, 2003.

(51) Int. Cl.
*G06F 11/10* (2006.01)

(52) U.S. Cl.
CPC ...... *G06F 11/1096* (2013.01); *G06F 11/1092* (2013.01); *G06F 2211/1035* (2013.01); *G06F 2211/1052* (2013.01)

(58) Field of Classification Search
CPC .... G06F 3/0689; G06F 11/1076; G06F 3/067; G06F 3/061; H05K 999/99
USPC .......................................................... 711/114
See application file for complete search history.

(56) References Cited

U.S. PATENT DOCUMENTS

| | | | | |
|---|---|---|---|---|
| 5,450,609 A | * | 9/1995 | Schultz et al. | 711/114 |
| 5,537,567 A | * | 7/1996 | Galbraith et al. | 711/114 |
| 5,568,629 A | * | 10/1996 | Gentry et al. | 711/114 |
| 5,586,292 A | * | 12/1996 | Yamaguchi | 711/114 |
| 5,822,782 A | * | 10/1998 | Humlicek et al. | 711/170 |
| 5,909,691 A | * | 6/1999 | Schultz et al. | 711/4 |
| 5,943,683 A | * | 8/1999 | Yamaguchi | 711/114 |
| 5,950,230 A | * | 9/1999 | Islam et al. | 711/156 |
| 6,161,192 A | * | 12/2000 | Lubbers et al. | 714/6 |
| 6,216,203 B1 | * | 4/2001 | Yamaguchi | 711/114 |
| 6,275,898 B1 | * | 8/2001 | DeKoning | 711/114 |
| 6,282,670 B1 | * | 8/2001 | Rezaul Islam et al. | 714/6 |
| 6,467,023 B1 | * | 10/2002 | DeKoning et al. | 711/114 |
| 6,530,031 B1 | * | 3/2003 | Randall et al. | 713/502 |

(Continued)

OTHER PUBLICATIONS

Hewlett Packard, "White Paper: Flash Dimm Technology", Apr. 24, 2001, pp. 1-2, http://www.docsolutions.fi/resources/whitepapers/wp_flash_dimm_technology.pdf?PHPSESSID=8478df2898e236a75eb0196542e4362f.*

(Continued)

*Primary Examiner* — Christopher D Birkhimer
(74) *Attorney, Agent, or Firm* — Winston Hsu

(57) ABSTRACT

A method for redundant array of independent disks (RAID) consistency initialization. The method allows fast RAID creation of the RAID subsystem and the RAID is capable of accepting I/O access after completion of the RAID creation. The method comprises the steps of: setting a RAID configuration, creating an initialization progress table (IPT) for storing the progress states of the initialization of the RAID, and writing the IPT and the RAID configuration into a non-volatile memory device. After that, the RAID can accept I/O access and meantime a consistency initialization can be performed according to the IPT. In one example, the consistency initialization comprises a consecutive initialization mechanism consecutively progressing in background mode and an induced consistency initialization mechanism induced by an I/O accessing to the RAID.

25 Claims, 17 Drawing Sheets

(56) References Cited

U.S. PATENT DOCUMENTS

| | | | |
|---|---|---|---|
| 2002/0099914 A1* | 7/2002 | Matsunami et al. | 711/154 |
| 2002/0156944 A1* | 10/2002 | Benhase et al. | 710/8 |
| 2002/0156973 A1* | 10/2002 | Ulrich et al. | 711/114 |
| 2002/0194526 A1* | 12/2002 | Ulrich et al. | 714/6 |
| 2003/0046490 A1* | 3/2003 | Busser et al. | 711/114 |
| 2003/0120674 A1* | 6/2003 | Morita et al. | 707/100 |
| 2003/0131163 A1* | 7/2003 | Ishii | G06F 3/0605 |
| | | | 710/52 |
| 2003/0140299 A1* | 7/2003 | Duncan et al. | 714/763 |
| 2003/0225982 A1* | 12/2003 | Fujita | G06F 3/0622 |
| | | | 711/148 |
| 2004/0153718 A1* | 8/2004 | Shen | G06F 11/2087 |
| | | | 714/5.11 |

OTHER PUBLICATIONS

TechTarget, "Nonvolatile Storage", Jun. 18, 2003, pp. 1-3, http://web.archive.org/web/20030618110443/http://searchstorage.techtarget.com/sDefinition/0,,sid5_gci212679,00.html.*

Webopedia, "Bit", Sep. 1, 1996, pp. 1-2, http://web.archive.org/web/20010405220043/http://www.webopedia.com/TERM/B/bit.html.*

* cited by examiner

*Figure 1A* (Prior Art)
*Figure 1B* (Prior Art)
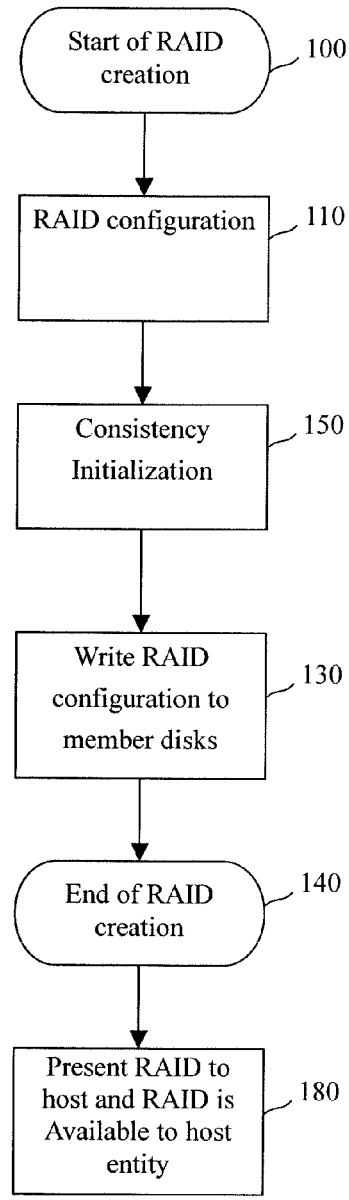
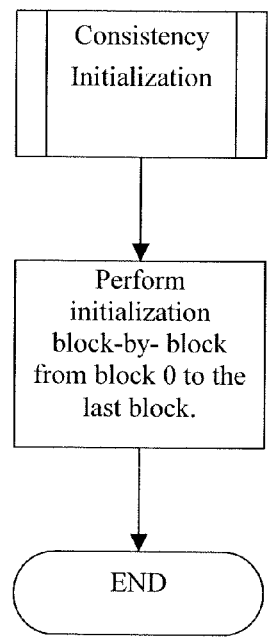

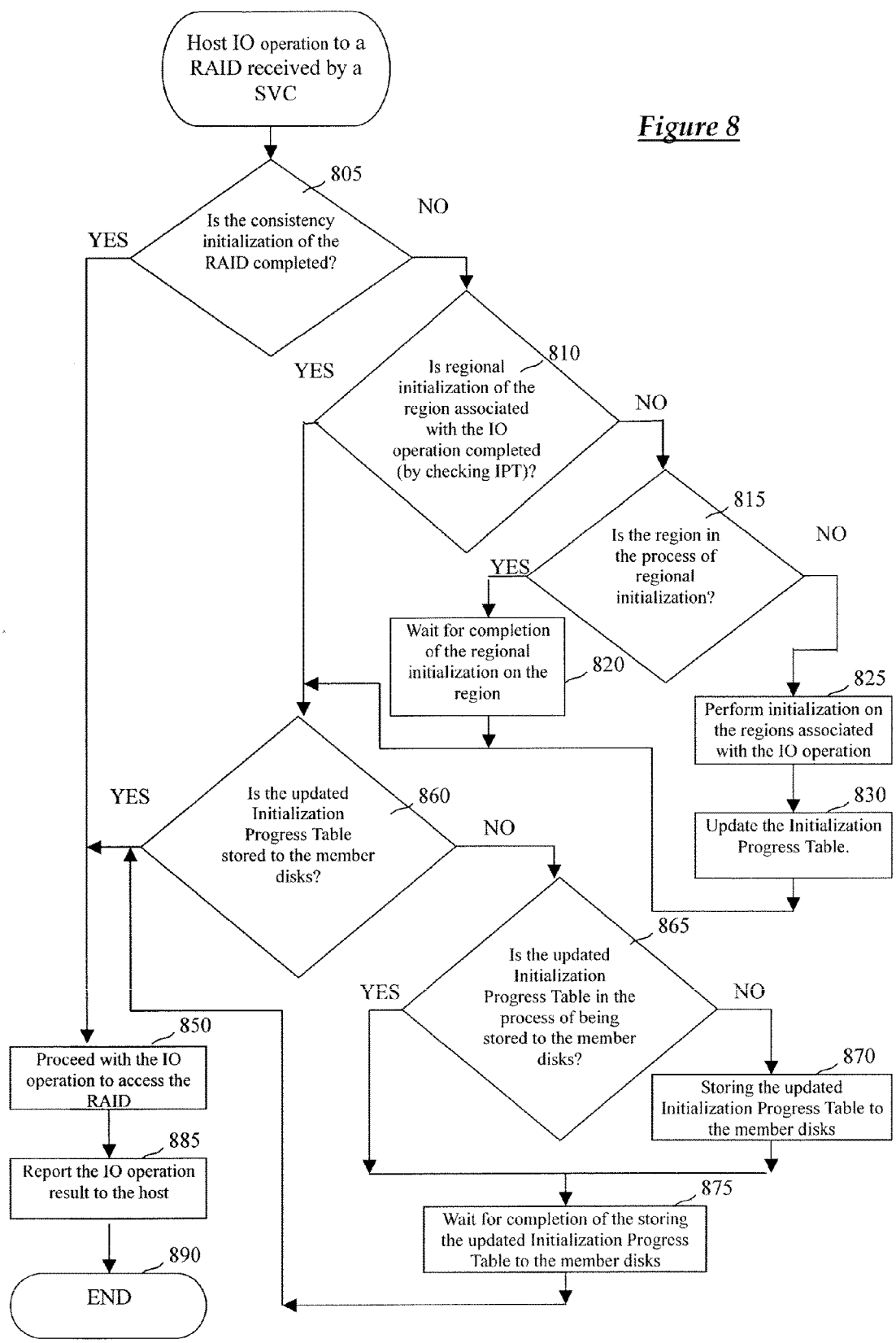

RAID CONSISTENCY INITIALIZATION METHOD

BACKGROUND OF THE INVENTION

1. Field of the Invention

The invention relates to a redundant array of independent disks (RAID) consistency initialization method.

2. Description of the Prior Art

In a computer system, a redundant array of independent disks subsystem (RAID subsystem) is used to provide data storage space having high availability, high performance, or high volume to the host entity.

A prior art RAID subsystem comprises a RAID controller, and a RAID composed of a plurality of hard disc drives (HDD) electrically connected to the RAID controller. Furthermore, the RAID controller defines the RAID as one or more logical disk drives of RAID—level 1, 3, or 5.

A RAID subsystem has to perform the process of RAID creation to define the RAID itself, and then is presented to the host entity. At this time, the RAID is available to the host entity or on line so that the host entity is capable of accessing the RAID. When the RAID is not available to the host entity or not on line, the host entity does not know the existence of the RAID and can not access the RAID.

The above-mentioned RAID creation is shown in FIG. 1A. When RAID creation is started (100), RAID configuration is firstly set (110), and then a consistency initialization is performed (150). After the consistency initialization is completed, the RAID configuration is written to the member disks (130). Meanwhile, the RAID creation is regarded as being completed (140), and the RAID is then presented to the host entity (180) so that the RAID is available to the host entity. The operation of the consistency initialization is to make user data and check data consistent. The consistency initialization needs to be performed because only when the member disks had been performed with consistency initialization, the data stored therein can be regenerated while the member disk is out of order. Please refer to FIG. 1B, which is a flow chart of a consistency initialization process according to the prior art. The consistency initialization is executed by performing initialization block-by-block from block 0 to the last block. That is, the consistency initialization is executed by performing initialization on block 0 firstly, and then on block 1 after block 0 is completely executed, and the consistency initialization is executed on the blocks one after another until the last block is completely executed.

In the prior art method of RAID creation and the consistency initialization, several problems are illustrated as follows. First, the consistency initialization spends a lot of time, such as a few hours, or even a few days. However, as mentioned above, before the consistency initialization is completed and the RAID is presented to the host entity, the RAID is not available to the host entity or not on line so that the RAID can not be accessed. In other words, it takes the users at least several hours to wait until the RAID subsystem can be used since the execution of the RAID creation. This makes users/customers very inconvenient.

Therefore, how to complete the RAID creation fast and present the RAID subsystem to the host entity or allow the RAID to be accessed by I/O as soon as possible becomes a serious problem to be solved.

SUMMARY OF THE INVENTION

It is therefore a primary objective of the claimed invention to provide a method which can quickly performs the RAID creation and make the RAID allow I/O accessing, to solve the above-mentioned problem which makes users wait for the completion of the consistency initialization.

According to the claimed invention, consumed time of waiting the completion of the consistency initialization of a RAID subsystem is eliminated, and simultaneously, the initialization can be performed on the data area to erase data, which exists previously, on the data area in order to prevent unexpected behavior of the host entity caused by the remained data.

According to an embodiment of the present invention, the method for redundant array of independent disks (RAID) consistency initialization comprises: creating RAID, including setting a RAID configuration of the RAID and creating an initialization progress table for storing progress states of the initialization of the RAID, wherein after the initialization progress table is created and before the completion of the consistency initialization is completed, the RAID is allowed to access and the consistency initialization is allowed to start.

According to another embodiment of the present invention, if a member disk failed and a new member disk is used to perform a rebuilding of the RAID before the completion of the consistency initialization, the rebuilding only has to perform on the regions which have been completed with the consistency initialization and the rebuilding on the regions which have not been completed with the consistency initialization can be performed by the consistency initialization.

According to still another embodiment of the present invention, when an I/O operation accessing the RAID is a read operation and a region on the RAID to be accessed by the I/O has not been initialized yet, no consistency initialization is performed on the region, and a value of zero or a predetermined value will be returned directly.

These and other objectives of the claimed invention will no doubt become obvious to those of ordinary skill in the art after reading the following detailed description of the preferred embodiment that is illustrated in the various figures and drawings.

BRIEF DESCRIPTION OF THE DRAWINGS

FIG. 1A illustrates a RAID creation according to the prior art;

FIG. 1B illustrates a process of a consistency initialization according to the prior art;

FIG. 8 is an embodiment of an induced consistency initialization according to the present invention;

DETAILED DESCRIPTION OF THE PREFERRED EMBODIMENT

The present invention provides a RAID consistency initialization method. The term "RAID (redundant array of independent disks)" used in the present invention broadly includes various RAID levels, such as NRAID, RAID0, 1, 2, 3, 4, 5, 6 and the combination thereof.

A RAID subsystem of the present invention comprises one or more RAID controllers, and one or more RAID arrays connected to the RAID controllers. The RAID controllers define the RAID array as one or more logical medium units (LMU) of one or various RAID levels and/or the combination of the RAID levels. This improves the data availability, the performance of data access, or increases the data storage volume. The RAID includes a plurality of physical storage devices (PSD), such as hard drives or other physical devices, for storing data. The possible RAID levels can be NRAID or RAID 0, 1, 2, 3, 4, 5, 6, etc.

In other words, a RAID subsystem can divides a plurality of PSDs into one or more LMUs of various RAID levels to make the RAID on-line, or to present the LMU or LMUs to the host entity and thus available to the host entity so that the host entity can access the RAID subsystem. The host entity of the RAID controller can be a host computer or another RAID controller, depending on the configuration of the RAID subsystem. Furthermore, the RAID controllers can be configured into a redundant RAID controller pair to improve the availability of the RAID subsystem.

Before a RAID is presented to the host entity or is on-line to accept I/O access, the RAID creation has to be completed first. According to an embodiment of the present invention, the RAID subsystem creation can start by commanding the RAID controllers. For example, a keyboard can be used to enter the commands to the RAID controller through RS232 port, or control buttons on the chassis of the RAID subsystem can be used to enter the commands to the RAID controller.

Figure 2A:
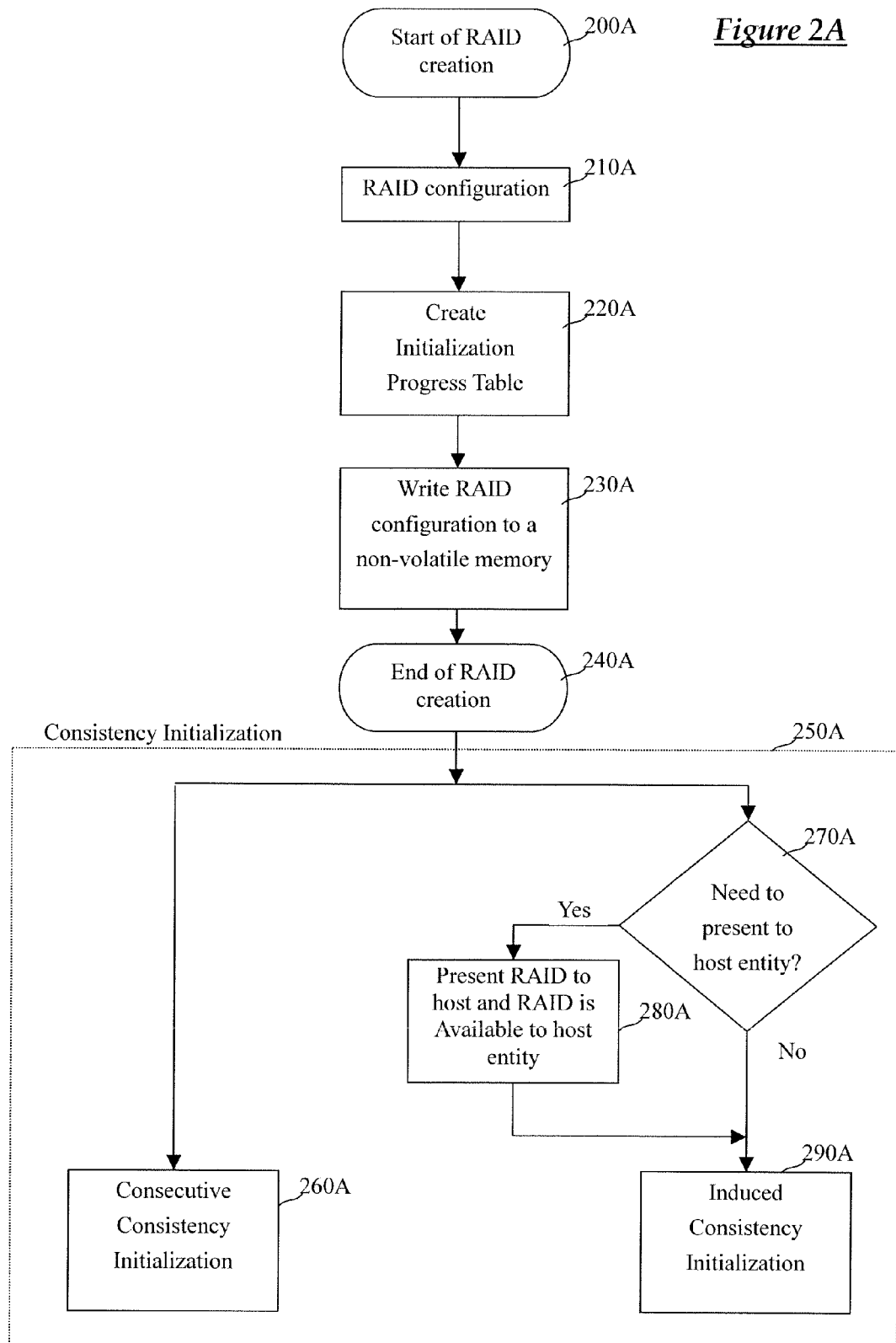
FIG. 2A is a diagram of an embodiment of a RAID consistency initialization method according to the present invention.

Please refer to an embodiment of a RAID consistency initialization method according to the present invention shown in FIG. 2A. In this embodiment, when the RAID controller receives the CREATE RAID command, it first sets the RAID configuration (210A) and then creates an initialization progress table in a memory (220A) in order to store the progress states of the initialization. Then, the initialization progress table and the RAID configuration are written into a non-volatile disk (230A). RAID creation is therefore completed (240A). At this time, the consistency initialization (250A) can be started.

The consistency initialization (250A) comprises two parts: consecutive consistency initialization (260A) and induced consistency initialization (290A). Consecutive consistency initialization is the consistency initialization that can be started to consecutively proceed in the background immediately after the RAID creation is completed or on an appropriate opportunity after the RAID creation is completed, such as when the RAID is presented to the host or after host I/O accesses the RAID. Induced consistency initialization is the consistency initialization that is induced by the access of an I/O to the RAID on a region which is not initialized, after the RAID creation is completed (280A). Because the RAID creation is very fast, for example, several seconds to several minutes, there's no need to wait since entering the RAID creation command till the completion of RAID creation, in which the prior art problems are completely avoided. The consistency initialization does not affect the access of the host entity to the RAID subsystem because it is performed in the background. Each RAID can be partitioned as one or more LMUs, and when the RAID creation is completed, these LMUs can be presented to the host entity. The present invention method is not affected by the partition. In the present embodiment, although the RAID configuration is written into member disks (230A), it can be written into other types of non-volatile memory device. Please note that the aforementioned non-volatile memory device can be a member disk, a disk drive other than the member disk, a battery backed-up SRAM, or a flash RAM. In conclusion, the non-volatile memory device is a memory device which can maintain the data stored therein when the power of the memory device is cut off.

Figure 2B:
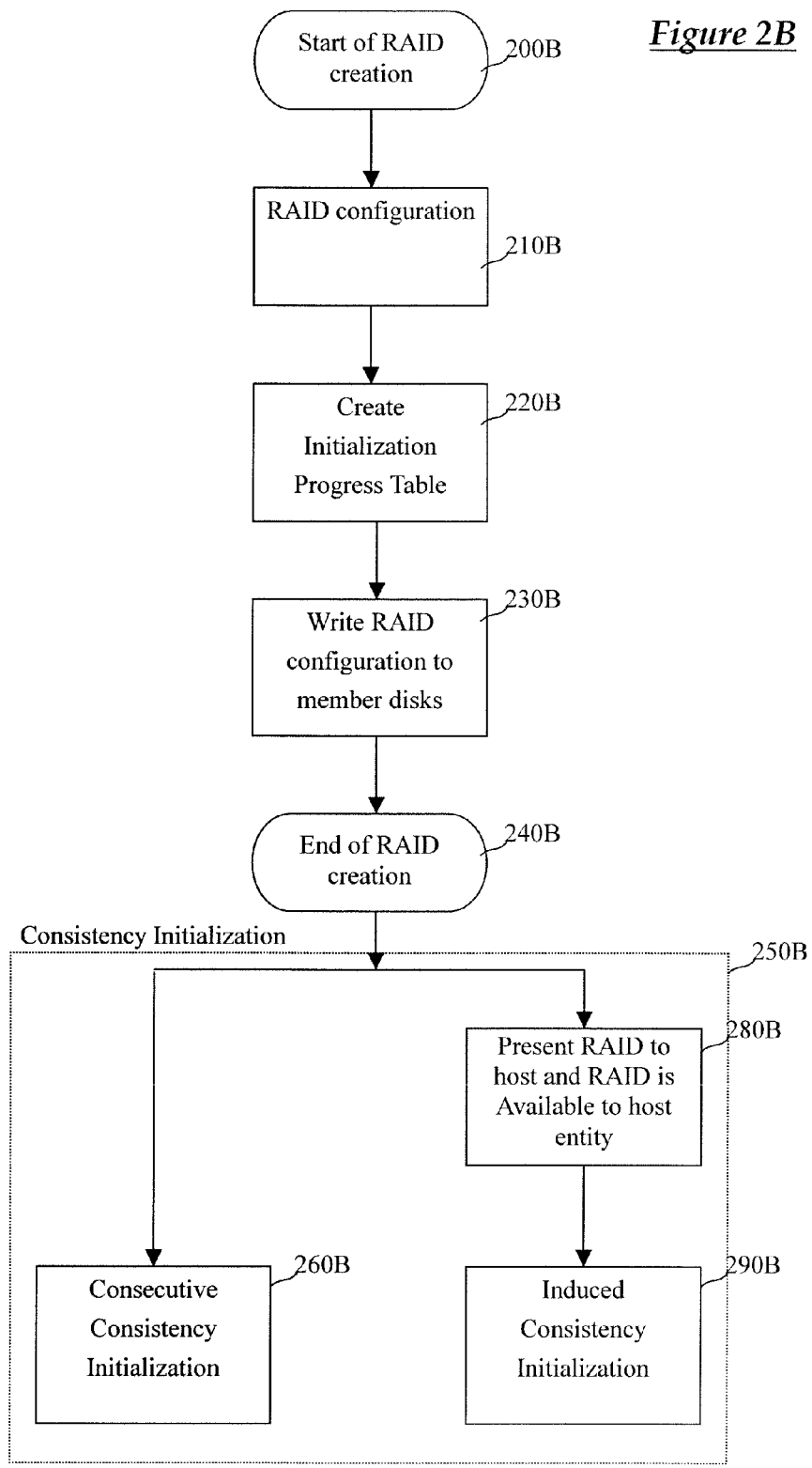
FIG. 2B is a diagram of another embodiment of a RAID consistency initialization method according to the present invention.

Please refer to another embodiment of a RAID consistency initialization method according to the present invention shown in FIG. 2B. In this embodiment, when the RAID controller receives the CREATE RAID command (200B), it first sets the RAID configuration (210B) and then creates an initialization progress table in a memory (220B) in order to store the progress states of the initialization. Then, the initialization progress table and the RAID configuration are written into member disks (230B). RAID creation is therefore completed (240B). At this time, the consistency initialization (250B) can be started. In the present embodiment, after the RAID creation is completed, the RAID is presented to the host entity (280B) first and then the induced consistency initialization (290B) is performed. When the host I/O accesses an address on the RAID which is not initialized, an induced consistency initialization occurred. Because the RAID creation is very fast, for example, several seconds to several minutes, there's no need to wait since entering the RAID creation command till the completion of RAID creation. Since the consistency initialization is performed in the background, it does not affect the access of the host entity to the RAID subsystem. In the present embodiment, although the RAID configuration is written into member disks (230B), it can be written into other types of non-volatile memory device as those mentioned in step (230A).

Figure 2C:
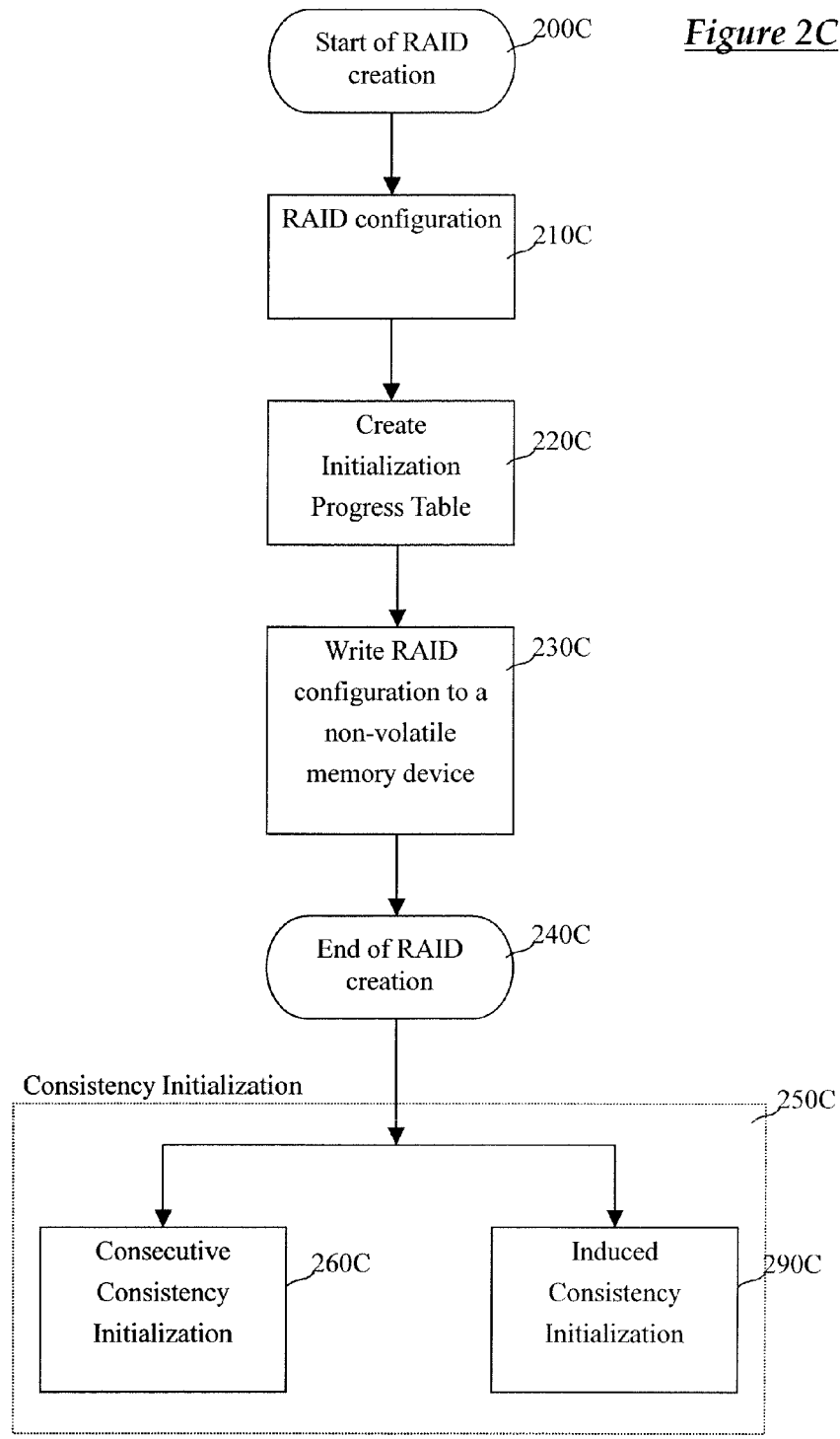
FIG. 2C is a diagram of still another embodiment of a RAID consistency initialization method according to the present invention.

Please refer to still another embodiment of a RAID consistency initialization method according to the present invention shown in FIG. 2C. In this embodiment, after the RAID CREATE is started (200C) and the RAID configuration is set (210C), an initialization progress table is created in a memory (220C). Then, the initialization progress table and the RAID configuration are written into member disks (230C). RAID creation is therefore completed (240B). At this time, the consistency initialization (250B) can be started. The consistency initialization (250C) comprises two parts: consecutive consistency initialization (260C) and induced consistency initialization (290C). In the induced consistency initialization, it is not necessary to consider whether the RAID is presented to the host or not, since the cause inducing the induced consistency initialization can be a host I/O or an I/O other than a host I/O. For example, when the RAID is storage portion of a large system, the I/O accessing the RAID might be an I/O to store data outside the system or an I/O to store data of the large system itself into the RAID. The large system, e.g., is a NAS (Network Attached Storage).

As shown in the above-mentioned FIG. 2A to FIG. 2C, the consistency initialization can be performed after the RAID creation is completed and the RAID can be accessed by an I/O.

Figure 3:
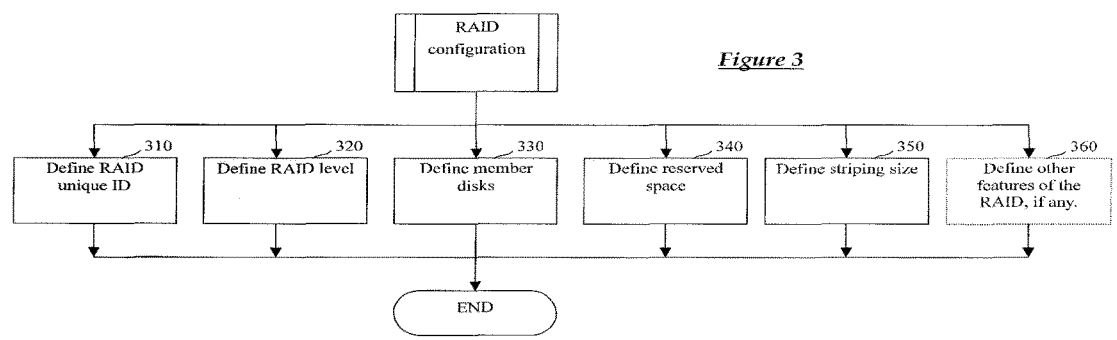
FIG. 3 is a block diagram of a RAID configuration setting of an embodiment according to the present invention.

Please refer to FIG. 3, which is a block diagram of an embodiment of a RAID configuration setting according to the present invention. As shown in FIG. 3, the aforementioned RAID configuration may comprise the steps of defining the RAID unique ID (310), the RAID level (320), the member disks (330), the reserved space (340), the striping size (350), and so on.

Each member disk has a data space and a reserved space, where the data space is used to store user data and/or check data and the reserved space is reserved for the RAID to store the information of the RAID configuration or other information. Please note that the reserved space is not used to store user data or check data.

The RAID unique ID is used for a RAID controller to check whether a disk drive belongs to a specific RAID or not. When the RAID subsystem is restarted while the power is resumed after accidentally cut off or due to some other unpredicted situations, the RAID controller will read data from the member disks. If the disks are not checked first as to whether it belongs to this RAID, a serious error may occur when data in the disks is used. The RAID configuration may also comprise write policy setting, (for example, selection of write through mode or write back mode), RAID size setting, or other information. Please note that the RAID configuration is stored in the above-mentioned reserved space of each member disk.

Figure 4:
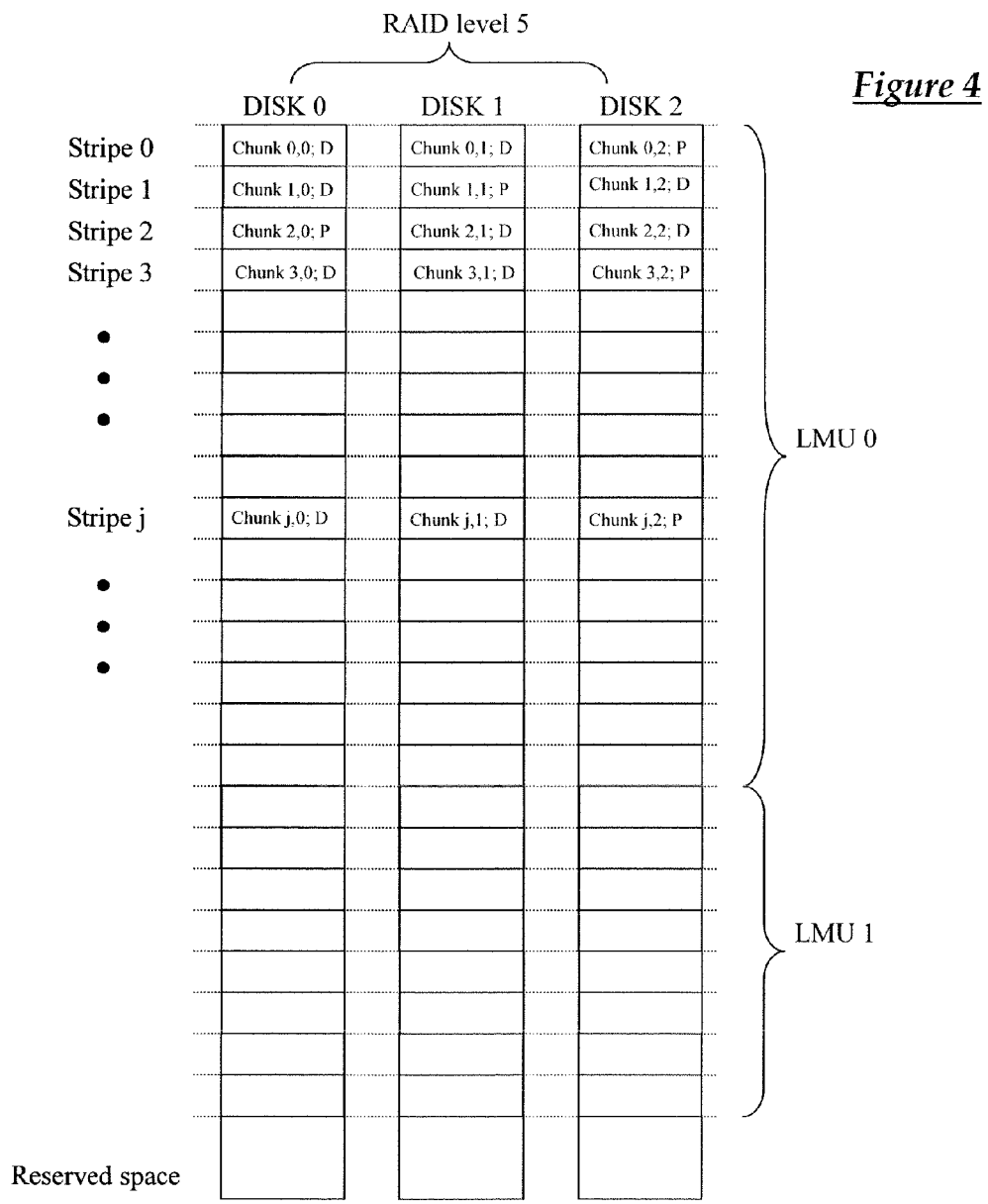
FIG. 4 is a diagram of a RAID of an embodiment according to the present invention.

Please refer to FIG. 4, which is a diagram of an embodiment of a RAID according to the present invention. As shown in FIG. 4, the RAID comprises three member disks, DISK0-DISK2. Furthermore, the RAID is partitioned into two LMUs, LMU0 and LMU1. The RAID is composed of a plurality of stripes, where each stripe comprises a check data chunk (here the check data chunk is a parity data chunk and is labeled as P) and two other chunks, which are user data chunks (labeled as D).

In FIG. 4, the RAID is a RAID level-5 RAID. Therefore, the data space is used to store user data and check data. In an NRAID or RAID level-0 RAID, there is no check data, so the data space is used to store user data. In addition, in a RAID level-1 RAID, although data stored in two chunks of the same stripe are both user data, the stripe can still be regarded as having a user data chunk and a check data chunk because the user data of the RAID level-1 RAID can be used for checking. Therefore, the data space can be regarded as for storing both user data and check data.

Figure 5A:
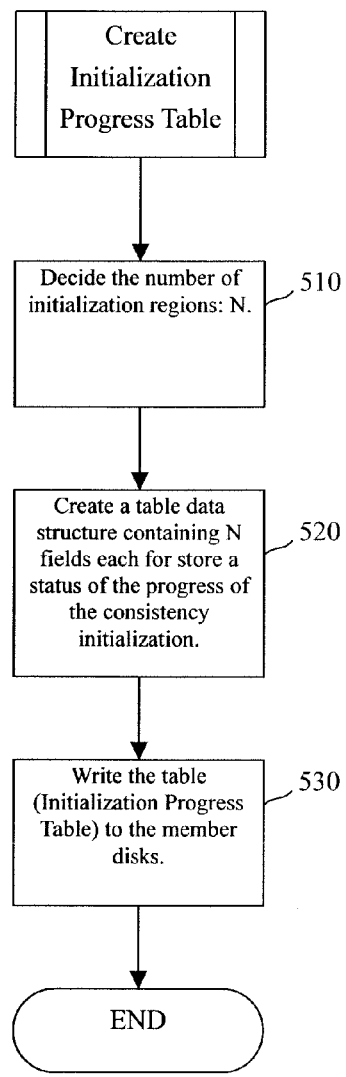
FIG. 5A is a flow chart of an embodiment of creating an initialization progress table according to the present invention.

Please refer to FIG. 5A, which is a flow chart of an embodiment for creating an initialization progress table according to the present invention. As shown in FIG. 5A, a value N is first determined as the number of regions the member disks of the RAID are to be divided into (510), where each region is a basic unit for performing consistency initialization. Then an initialization progress table is created having N fields to record the initialization state of each initialization region (520). After the initialization progress table is written to each member disks (530), and the process of initialization progress table creation is completed. The above-mentioned basic units are called initialization regions and the initialization on each initialization region is called regional initialization. The present invention consistency initialization is performed by performing regional initialization on each initialization region. When the regional initialization on all initialization regions is completed and the completion state is stored in the reserved space of the member disks, the consistency initialization is completed.

Figure 5B:
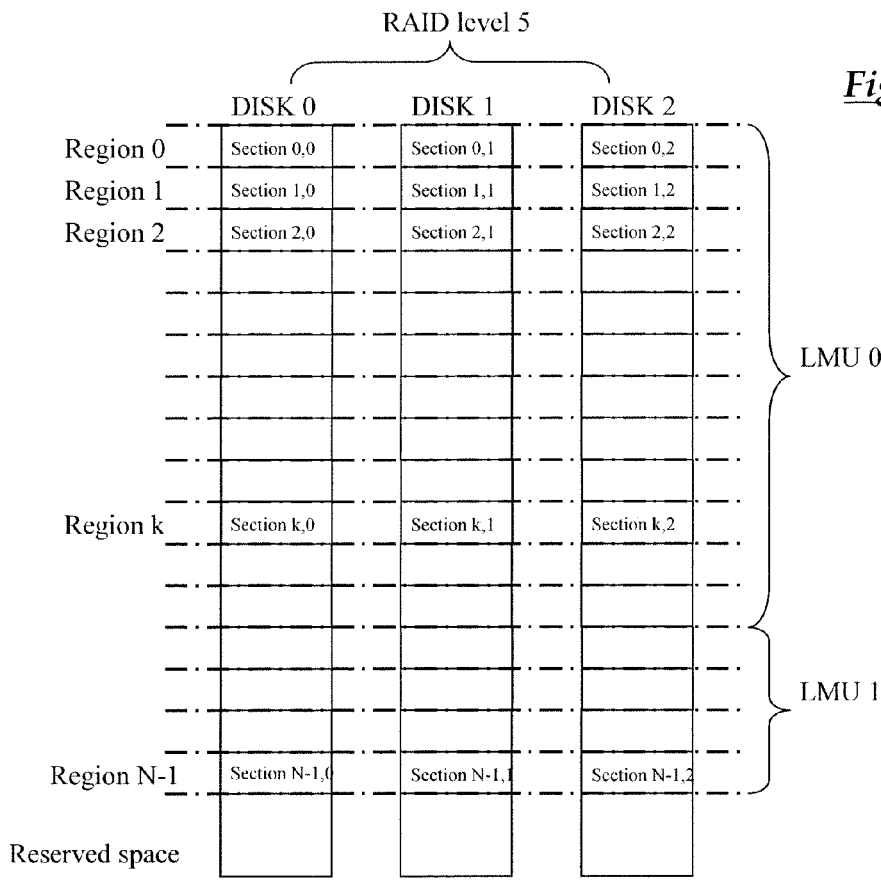
FIG. 5B and FIG. 5C illustrate an embodiment of defining initialization regions of the RAID shown in FIG. 4 by the method shown in FIG. 5 according to the present invention.
Figure 5C:
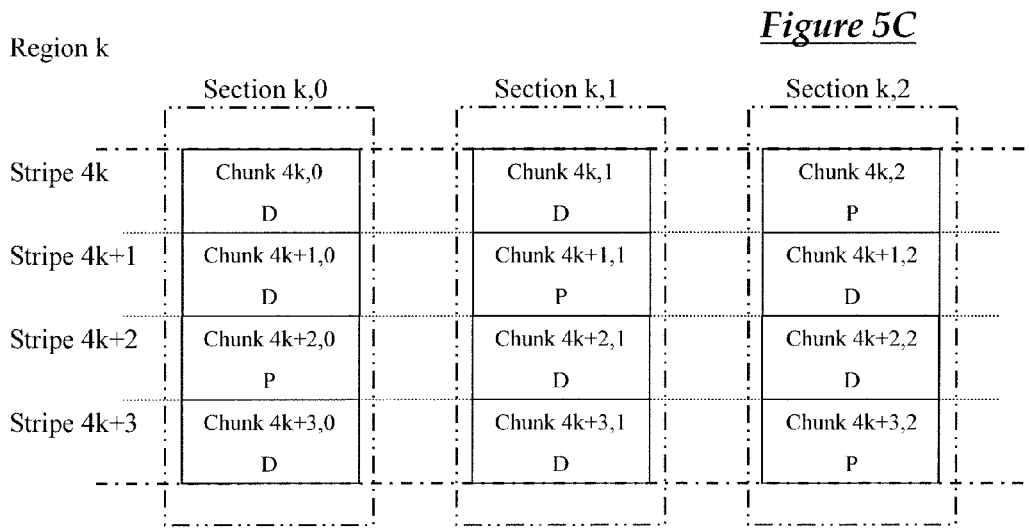

Please refer to FIG. 5B and FIG. 5C, which illustrate an embodiment of defining initialization regions of the RAID shown in FIG. 4 by the method shown in FIG. 5A of the present invention. As shown in FIG. 5B, the data space of the member disk of the RAID is divided into N initialization regions of the same size, where each initialization region includes 3 sections each belonging to a different member disks. As shown in FIG. 5C, each initialization region includes 4 stripes, so that each section includes 4 chunks. Each of the 4 stripes of the same initialization area has 3 chunks, which includes 2 user data chunks D and 1 check data chunk P, wherein the check data chunk is a parity data chunk. The value stored in the parity data chunk is the exclusive-OR value of the values stored in the user data chunks. The check data chunks can be in the same section, or spread in different sections.

Although in the above-mentioned embodiments, the initialization region is larger than a stripe and includes 4 stripes, the size of an initialization region, in general, is not necessarily larger or smaller than that of a stripe.

The considerations for determination of the above-mentioned N are as follows. First, when N is large, the number of initialization regions of the RAID is large, and each initialization region is small. Therefore, more reserved space is needed to store the initialization progress table, but the time of performing regional initialization on each initialization region is less and the host I/O can be performed without waiting too long. Oppositely, if N is small, the number of initialization regions of the RAID is small and each initialization region is large. Therefore, only a small reserved space is needed to store the initialization progress table, but each initialization region needs a lot of time to be initialized and the host I/O has to wait for a long while for the completion of the regional initialization. For example, if a storing space of a member disk is 256 G bytes, and if each initialization region is 256K bytes, the N is determined as 1 M (1*1024*1024). Here, if the initialization progress state of each initialization region is indicated by only 1 bit, the initialization progress table occupies at least 1 M bits (128K bytes). In another example, if each initialization region is 10 M bytes, and if the RAID has 10 member disks, which are connected to the same channel of a channel speed of 200 M bytes/second (for a typical Fibre channel), the initialization of each initialization region needs at least 10 M bytes*10/

200 M Bytes/second=0.5 second. That is, the host I/O has to wait at least 0.5 second for the initialization, which makes the host I/O too slow.

In the above-mentioned embodiments, the initialization regions are of the same size, but in another embodiment, the initialization regions may be of different sizes.

When in use, the initialization progress table is stored in the memory of the RAID controller, and the initialization progress state is always updated in the initialization progress table. Furthermore, the initialization progress table will be stored in each member disk later. After the RAID creation is completed and before the consistency initialization is completed, if the RAID subsystem has to be restarted when the power is resumed after suddenly cut off or due to some other unexpected reasons, the initialization progress tables stored in the member disks can be read into the memory first and a correct initialization progress table will be identified through CRC check. Therefore, the uncompleted consistency initialization can be continued according to the correct initialization progress table. For example, the initialization state of each initialization region can be indicated by one bit stored in the initialization progress table, where if the initialization region is initialized completely, the bit is 1, otherwise, the bit is 0. That the bit is 0 means that either the initialization has not been started yet or the initialization has been started but yet not completed.

When the RAID creation is completed and the defined RAID is presented to the host entity as LMU(s) so that the RAID subsystem is available to the host entity, the RAID subsystem starts to perform the consistency initialization according to a predetermined schedule. This is the above-mentioned consecutive consistency initialization, which is performed continuously until the consistency initialization is completed. However, when the host entity accesses a RAID and a associated RAID controller receives a host I/O command and parses the command to access a initialization region corresponding to the host I/O command, if the initialization region is not initialized, the regional initialization is induced to be performed due to the host I/O command. This is the above-mentioned induced consistency initialization.

Because the consecutive consistency initialization (shown in FIG. 6A), which is performed according to a predetermined schedule, and the induced consistency initialization (shown in FIG. 8, FIG. 9A, and FIG. 9B), which is induced by the host I/O, have no direct relation between them, the consecutive consistency initialization and the induced consistency initialization are performed separately. The only concern is if either one of the consecutive consistency initialization and the induced consistency initialization is performed on a particular initialization region, the other cannot be performed on the same initialization region such that data stored therein will not be destroyed.

Figure 6A:
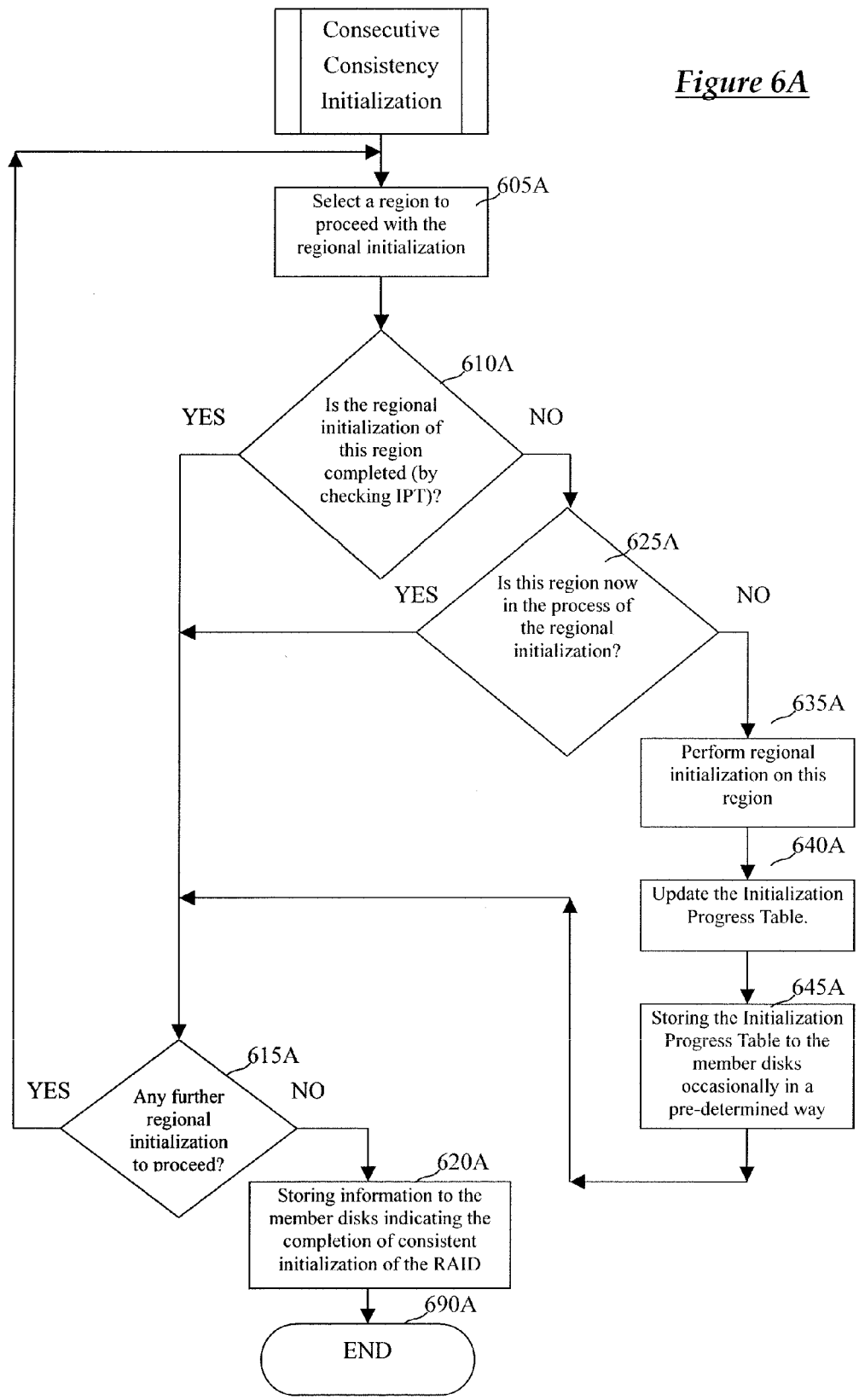
FIG. 6A is an embodiment of a consecutive consistency initialization according to the present invention.

Please refer to FIG. 6A, which is a diagram of an embodiment of a consecutive consistency initialization according to the present invention. First, an initialization region is selected to be initialized (605A), and then the selected initialization region is tested to determine whether the initialization of the selected initialization region has been completed (610A). If it is affirmative in (610A), determining if there is another initialization region which has not yet completed initialization (615A). If it is affirmative in (615A) indicating that there is an initialization region which has not yet completed with the initialization, then step (605A) is performed. On the other hand, if it is negative in step (615A), which means there is no initialization region which has not been initialized yet, waiting for the completion of the initialization of all initialization regions. Therefore, the information of the completion of all RAID initialization regions is stored into the member disk (620A), and then the consistency initialization is completed (690A). If it is detected that the initialization on this region has not been completed in step (610A), the selected initialization region is tested to see if it is now being initialized (625A). If in step (625A) it is affirmative, which means that the selected initialization region is now being initialized, the process can wait for the completion of the initialization, or the selected initialization region can be skipped directly and the step (615A) can be performed to determine if there is any initialization region of which the initialization is not completed. On the contrary, if in the step (625A) it is negative, which means that the selected initialization region has not been initialized yet, the selected initialization region is initialized immediately (635A), and then the initialization progress state stored in the initialization progress table (640A) is updated. The initialization progress table is then stored in the member disks (645A) in a suitable time after the completion of the regional initialization. The suitable time can be the timing when the whole regional initialization process is performed to a certain extent, for example, when a predetermined number of initialization regions or a predetermined percentage of the initialization regions is completed with the regional initialization, or after a predetermined time has elapsed since the initialization progress table was stored in the member disk last time. When the step (645A) is completed, the step (615A) is performed to see if there is any initialization region not completed with the initialization, and related procedure is performed until all initialization regions are completed with the initialization (690A). In step (610A), the completion of the regional initialization includes completion of updating the initialization progress state to the initialization progress table. In step (625A), the state of being initialized of the regional progress initialization comprises updating the initialization progress state to the initialization progress table.

In step (645A), the purpose of writing the initialization progress table into the member disk in a suitable time is to raise the performance. Because the initialization region is in the data space while the initialization progress table is in the reserved space, a pickup head of a disk drive has to move between the two spaces when initialization process and writing of the initialization progress table into the disk drive are performed at the same time. This causes a bad performance. Please note that in step (645A) of writing the initialization progress table into the member disk, it can simply update the changing part of the initialization progress table instead of writing the whole initialization progress table into the member disk.

The reason why the test step (610A) is performed is that some initialization regions have been initialized because of some reasons and do not have to and cannot be initialized again since initialization of these initialization regions has been completed and apparently does not have to be done again, and moreover, there may be some data generated due to the host I/O stored in the initialized regions and would be destroyed, for example, reset to zero, if initialization is performed again. One of the possible reasons mentioned above why the initialization of some regions have been completed is that when the host entity performed I/O operation on a RAID, the associated initialization regions which had not been initialized yet started to be initialized, and thus some of these initialization regions have been already completed with initialization.

The step (625A) is performed because some initialization regions may be now being initialized but not completed due to some reasons. These initialization regions do not need to be initialized again because they are "being" initialized. One of the possible reasons mentioned above why the initialization of some regions are being initialized is that when the host entity performed I/O operation on a RAID, the associated initialization regions which had been initialized yet started to be initialized, and thus some of these initialization regions are being.

In step (605A) of selecting an initialization region to perform the initialization, it can be of a predetermined way to perform the regional initialization. For example, the regional initialization can be started from a certain initialization region, and sections of the certain initialization on the different PSDs are initialized one by one, and then proceeds to another initialization region, on the sections thereof. The initialization progress state of each region in the initialization progress table is updated. At last, all initialization regions are initialized completely and the consistency initialization is completed. The order of the regional initialization can be determined according to the order of the addresses, such as from a small address to a large address, or from a large address to a small address, or a predetermined order, or even not according to a specific order, such as in random. In other words, any method capable of selecting the initialization region that is not completed with the initialization can be used in the present invention.

According to an embodiment of the present invention, the regional initialization can define all user/check data space of the member disks to a predetermined state, and make the user data consistent with the check data. This can prevent from unexpected behaviors of the host resulted from the fact that the user data are not predefined. According to another embodiment of the present invention, the regional initialization can simply define the user data into a predetermined state, especially for the NRAID or RAID level 0 RAID (because no check data exists therein).

Although the member disk may fail when the consistency initialization is performed, the data in the failed member disk can be regenerated from other member disks. For example, in a RAID level 1, 2, 3, 4, 5 RAID, data can be regenerated from the user/check data of other member disks. However, in a NRAID or RAID level 0 RAID, there is no check data for protection of user data. If data rebuilding has to be performed during the consistency initialization, only initialization regions on which the initialization has been completed will perform the data rebuilding. The other initialization regions which have not been completed with the consistency initialization will perform the data rebuilding through the initialization.

Figure 6B:
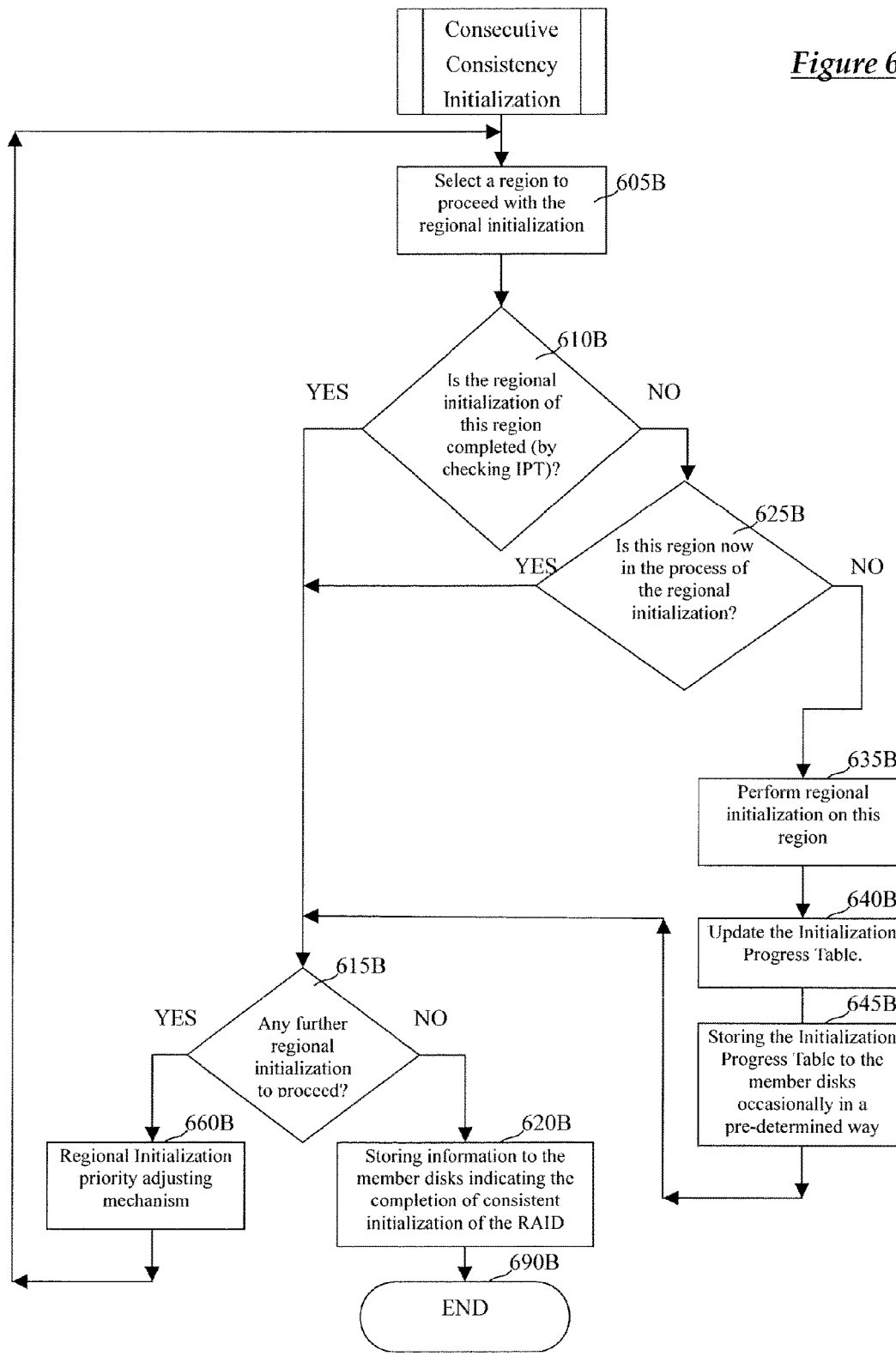
FIG. 6B is another embodiment of a consecutive consistency initialization according to the present invention.

Please refer to FIG. 6B, which is a diagram of another embodiment of a consecutive consistency initialization according to the present invention. This embodiment shown in FIG. 6B is quite similar to the embodiment shown in FIG. 6A. The only difference is that after the step (615B) when there is a region needed to perform regional initialization, the regional initialization priority adjusting mechanism is performed (660B) first, and then the step (605B) is performed.

The strategy in the embodiment shown in FIG. 6B is explained as follows. If there is no I/O command from the host entity to the RAID controller, the initialization is performed in a predetermined way. If there exists an I/O command from the host entity to the RAID controller, the regional initialization corresponding to the I/O command mapped from the host I/O can be performed. Moreover, the priority of the regional initialization induced by the I/O command can be raised in the initialization.

Figure 7A:
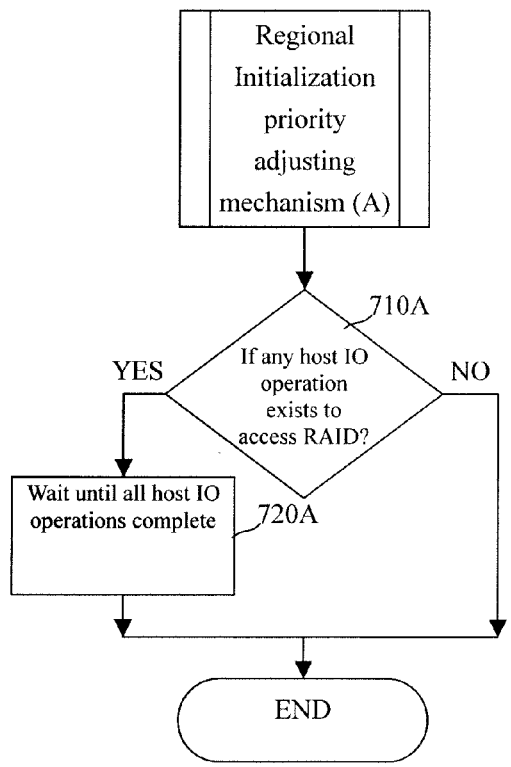
FIG. 7A is an embodiment of a regional initialization priority adjustment mechanism according to the present invention.
Figure 7B:
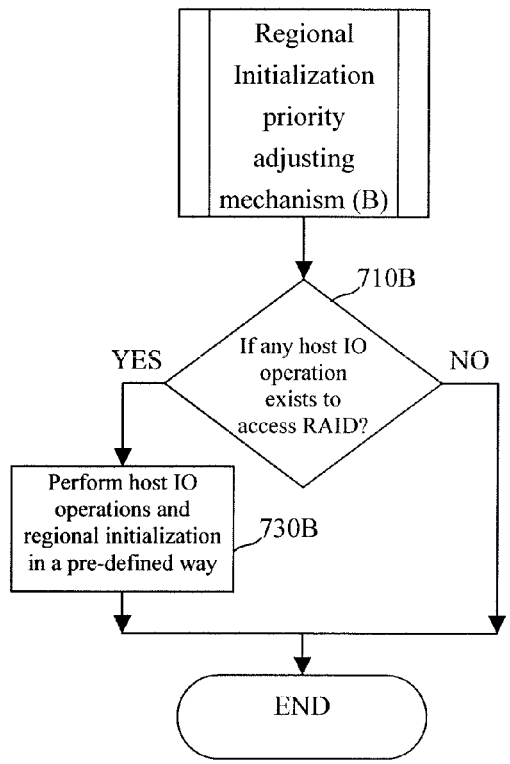
FIG. 7B is another embodiment of a regional initialization priority adjustment mechanism according to the present invention.

Several embodiments of the priority adjusting mechanism (660B) can be seen in FIG. 7A and FIG. 7B. In FIG. 7A, the priority adjusting mechanism detects whether there is a host I/O accessing a RAID which is performing the initialization. If there is, the regional initialization is performed after all associated host I/O is completed.

In FIG. 7B, the priority adjusting mechanism (660B) detects whether there is a host I/O to access a RAID which is performing the initialization. If there is, the associated host I/O and the regional initialization can be performed in a predetermined way, for example, two induced consistency initialization induced by the host I/O can be performed first, and then one conductive consistency initialization is performed. According to one embodiment of FIG. 7B, the predetermined way can be performing the regional initialization and the host I/O in stagger. According to another embodiment of FIG. 7B, the predetermined way can be that there is an upper limit to the number of concurrent regional initializations, such as 3, and there is another upper limit to the number of concurrent regional initialization induced by the host I/O, such as 2, to maintain the performance of the system.

Please refer to FIG. 8, which is a diagram of an embodiment of an induced consistency initialization according to the present invention. When the RAID controller receives a host I/O to access the RAID, the RAID controller will test whether the consistency initialization is completed (805). If in step (805) it is affirmative, which means that the RAID initialization is completed and the initialization information is stored in the member disk and the consistency initialization is over, the RAID can be accesses according to the host I/O. If in step (805) it is negative, the initialization table is checked to determine whether the initialization region corresponding to the host I/O is completed with initialization (810). If step (810) is affirmative, and then it is tested to see if the initialization progress table has been stored in the member disk (860). If step (810) is negative, testing if the associated initialization regions are being initialized (815). If step (815) is affirmative, step (820) of waiting the completion of the initialization region is initialized is performed and then step (860) of detecting whether the initialization progress table is stored in the member disk is performed. If step (815) is negative, the initialization is performed on the initialization region corresponding to the host I/O (825), and then the initialization progress table is updated to the memory (830), and further, checking if the initialization progress table is stored in the member disk is performed (860). If step (860) is affirmative, which means that the initialization progress table is stored in the member, the RAID is accessed according to the host I/O (850). If step (860) is negative, testing whether the initialization progress table is being stored to the member disk (865). If step (865) is affirmative, the step (875) of waiting until the initialization progress table is stored in the member disk is performed. If the step (865) is negative, the initialization progress table has to be stored to the member disk (870) first, and then the step (875) of waiting until the initialization progress table is stored in the member disk is performed. After the step (875) is completed, the step (850) is performed. When the host I/O accessing the RAID is completed, the RAID controller reports the result of the host I/O to the host entity (885), and the host I/O is completed (890). Please note that in step (870), when writing the updated initialization progress table into the member disk, we can simply update the changed part of the initialization progress table or we can write the whole initialization progress table into the member disk. When the write policy of the RAID is set to write back mode, it is not necessary to perform step (885) to reports the result of the host I/O to the host entity since it has been reported when the RAID controller received the host I/O.

Although in FIG. 8, the updated initialization progress table is written into the member disk in step (870), in another embodiment of the present invention, however, the updated initialization progress table can be written into the member disk immediately after the initialization progress table has been updated in the memory (830). This does not change the function of the present invention if other steps keep unchanged. Generally speaking, the updated initialization progress table has to be updated to the member disk before the RAID is accessed due to the I/O operation.

In FIG. 8, every time when the regional initialization is completed (825), the initialization progress table is written into the reserved space once (835). Because the addresses of the host I/O and of the reserved space are different, the performance is reduced. In order to raise the performance, according to an embodiment of the present invention, the initialization progress table is updated in the memory instead of in the member disk first when an initialization region is completed with initialization, and the initialized progress table is written into the reserved space of the member disk after the associated host I/O is completed. If other regional initializations have been completed before such host I/O is completed and the initialization progress table is written into the member disks therefore, the updated data in initialization progress table due to such host I/O is also written into the member disks accordingly and does not have to write again. In general, this reduces the writing times of the initialization progress table into the member disks, and the performance is raised. This is shown in FIG. 9A and FIG. 9B.

Figure 9A:
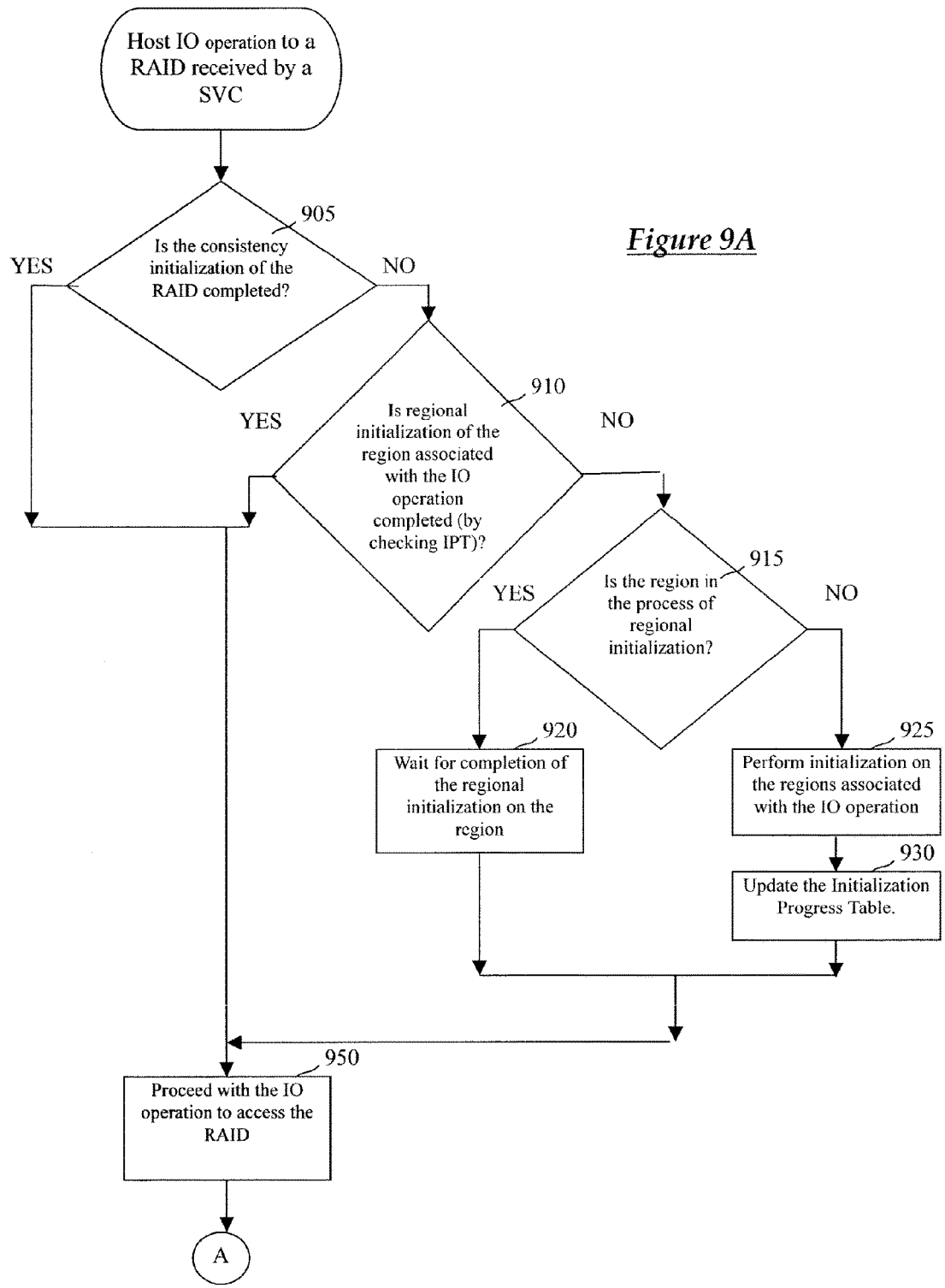
FIG. 9A and FIG. 9B are another embodiment of an induced consistency initialization according to the present invention.
Figure 9B:
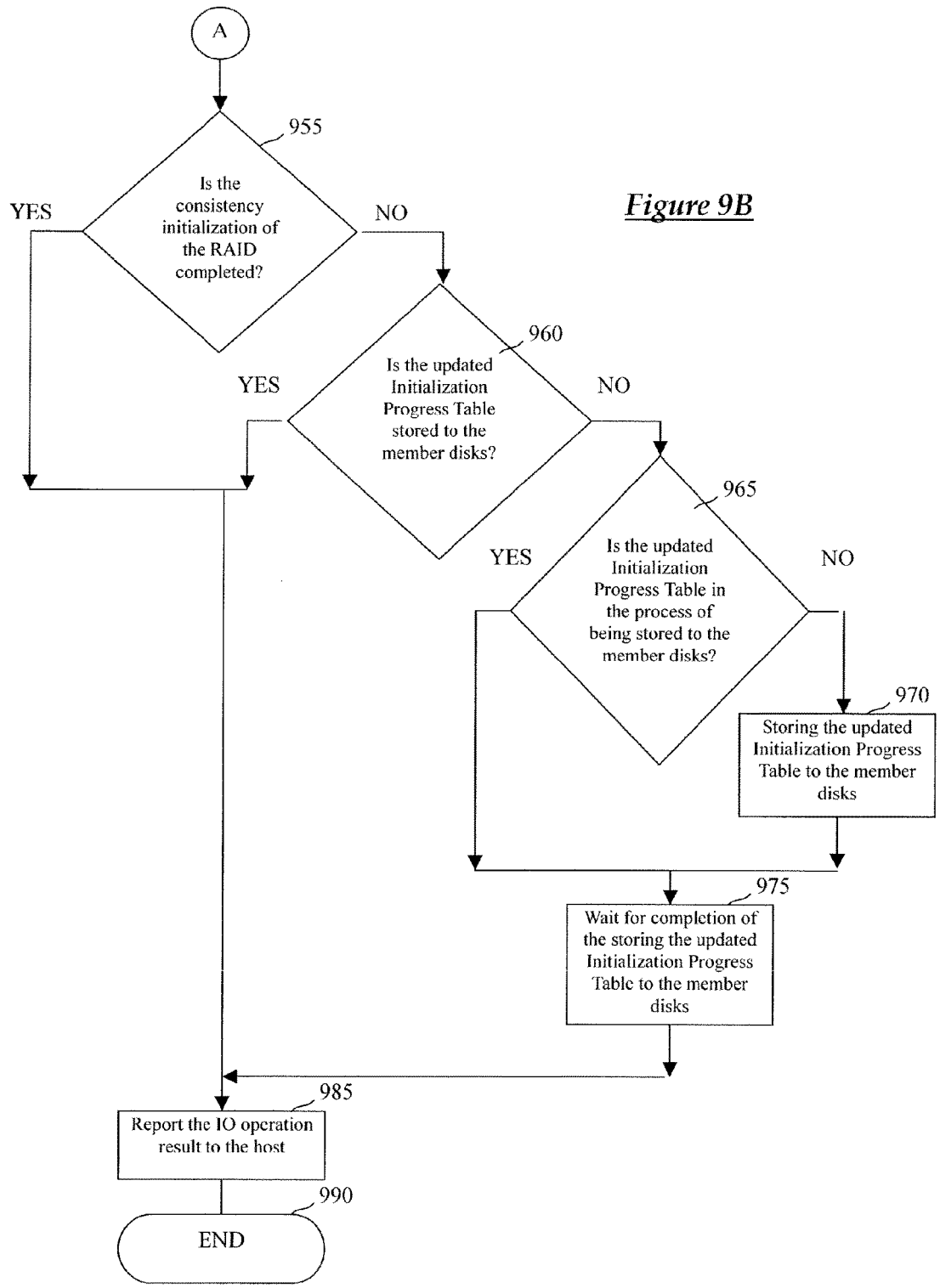

FIG. 9A and FIG. 9B are diagrams of another embodiment of an induced consistency initialization according to the present invention. As shown in FIG. 9A, when the RAID controller receives a host I/O accessing the RAID, it is tested to see if the consistency initialization of the RAID is completed (905). If step (905) is affirmative, the RAID is accessed according to the I/O operation (950). If step (905) is negative, the initialization progress table is checked to determine whether the initialization of the associated initialization region is completed (910). If step (910) is affirmative, the RAID is accessed according to the I/O operation (950). If step (910) is negative, it is necessary to test if the associated initialization region is being initialized (915). If the step (915) is affirmative, step (920) of waiting for the completion of the initialization of the associated initialization region is performed, and then the RAID is accessed according to the I/O operation (950), if the step (915) is negative, the associated initialization region starts to be initialized (925), and then the initialization progress table is updated into the memory after the initialization is completed (930), and further, the RAID is accessed according to the I/O operation (950).

In FIG. 8 and FIG. 9A, in steps (810) and (910), the completion of the regional initialization includes completion of updating the initialization progress state to the initialization progress table. In steps (815) and (915), the state of being initialized of the regional initialization includes updating the initialization progress state to the initialization progress table. In step (820) and (920), waiting for the initialization region initialized includes waiting for updating the initialization progress state to the initialization progress table.

After the RAID access resulting from the I/O operation is completed (950), the initialization progress table will be stored into the member disks. As shown in FIG. 9B, it is checked to see if the consistency initialization of the RAID is completed (955). If step (955) is affirmative, which means that the consistency initialization is completed and the initialization progress table does not need to be stored in the member disk. The RAID controller reports the I/O operation result to the host entity (985). If step (955) is negative, testing to determine if the updated initialized progress table is stored in the member disk (960). If step (960) is affirmative, which means that the updated initialization progress table has been stored in the member disk, so that the updated initialization progress table does not have to be stored in the member disk again, and the RAID controller reports I/O operation result to the host entity (985). If step (960) is negative, checking if the updated initialization progress table is being stored into the member disk (965). If step (965) is affirmative, step (975) of waiting for the completion of storing the updated initialization progress table into the member disk is performed, and then the RAID controller reports the I/O operation result to the host entity (985). If step (965) is negative, step (970) of storing the updated initialization progress table is performed, and then step (975) of waiting for the completion of the storing the updated initialization progress table into the member disk is performed, and then the RAID controller reports the I/O operation result to the host entity (985). After the RAID controller reports the I/O operation result to the host entity (985), the I/O operation is completed (990). When the write policy of the RAID is set to write back mode, it is not necessary to perform step (985) to reports the result of the host I/O to the host entity since it has been reported when the RAID controller received the host I/O.

Figure 10:
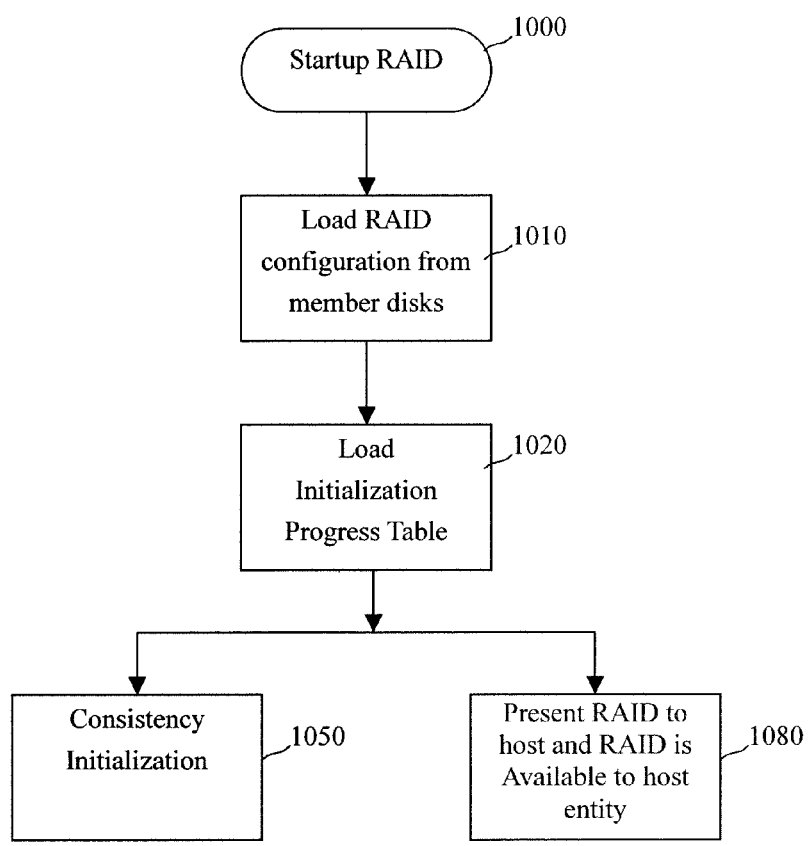
FIG. 10 is a diagram of restarting a RAID subsystem when the RAID creation is completed but the consistency initialization has not been completed yet according to the present invention.

When the RAID creation is completed and before the consistency initialization is completed, if the RAID subsystem is restarted when power is resumed after cut off or due to some other unexpected reasons, the RAID configuration is loaded to the RAID controller from the member disks (1010) first (as shown in FIG. 10), and then the initialization progress table is loaded (1020), and further, the RAID originally defined is presented to the host entity (1080) and the previous consistency initialization is continued (1050).

Figure 11:
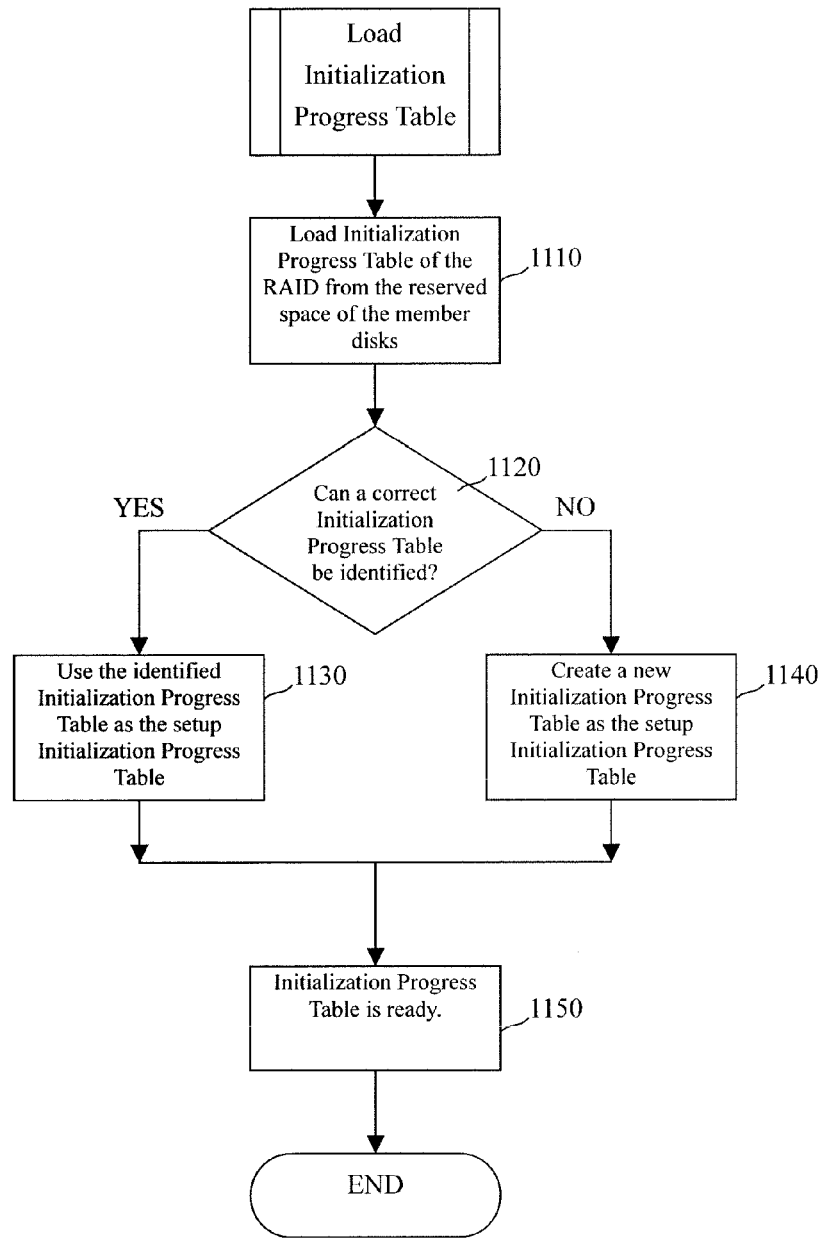
FIG. 11 is a diagram of loading an initialization progress table when the RAID subsystem is restarted according to the present invention; and, FIG. 12 is a diagram of an embodiment of identifying a correct initialization progress table when the initialization progress table is loaded in FIG. 11 according to the present invention.

Please refer to FIG. 11, which is a diagram of loading an initialization progress table when the RAID subsystem is restarted according to the present invention. First, the initialization progress tables are loaded from the member disks (1110), and the initialization progress tables are checked to see if a correct initialization progress table can be identified (1120). If a correct initialization progress table is identified, it can be used as the set initialization progress table (1130). In a normal situation, if there has ever been an initialization progress table stored in a member disk, a correct initialization progress table should be identified (1050). Furthermore, if the consistency initialization is not completed, the uncompleted consistency initialization can be continued according to the correct initialization progress table. On the other hand, if no correct initialization progress table is identified, a new initialization progress table will be created as the set initialization progress table for initialization (1140). Usually, this would not happen. Were it to happen, the RAID is in an unpredictable and abnormal state, and the original data stored in the member disks could be lost because a new initialization progress table is created and a new regional initialization is started.

Please note that, a data structure of an initialization progress table may comprise the unique ID and the update sequence number of the RAID. In addition, the data can be protected by CRC to maintain the correctness of data. Moreover, each member disk can store one or more initialization progress tables, for example, two initialization progress tables. When an updated initialization progress table is stored in the member disk, only one of the initialization progress tables stored therein is updated. This prevents from data errors occurred in all member disks if power is cut off while the initialization progress table is being updated. That is, the member disk can store several versions of initialization progress table. More details are shown in FIG. 12.

Figure 12:
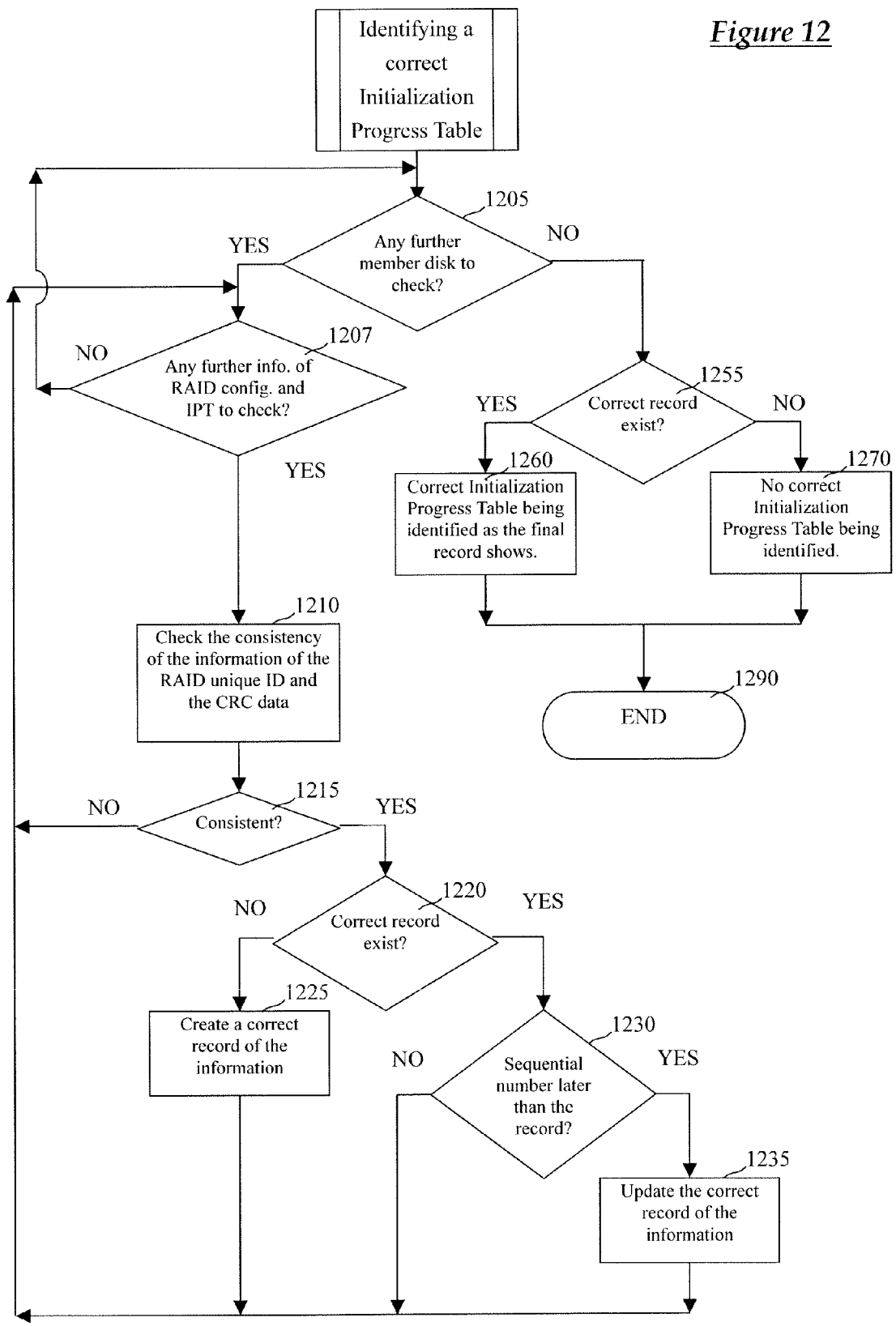

Please refer to FIG. 12, which is a diagram of an embodiment of identifying a correct initialization progress table according to the present invention. Here, one member disk can store one or more initialization progress tables. The present inventive method checks all initialization progress tables in each member disk, stores a latest correct initialization progress table as a record or updates the earlier record of the initialization progress tables to determine if a correct initialization progress table can be identified after all member disks are all checked.

First, step (1205) of detecting whether there is a member disk which has not been detected yet is performed. If step (1205) is affirmative, step (1207) of detecting if in that member disk there is an initialization progress table which has not been checked yet. Since each member disk has more than one version of initialization progress table, it is necessary to check and identify the latest and correct initialization progress table. If step (1207) is affirmative which means that there exists an initialization progress table which is not checked, and the unique ID of the member disk is checked to see if the disk is a member disk of the RAID and the initialization progress table is checked to see if the initialization progress table is consistent with the CRC data (1210), where the CRC data is generated by calculating the initialization progress table and stored in the reserved space. If the disk drive does not belong to the RAID or the initialization progress table is not consistent with the CRC data (1215), the initialization progress table can not be used and step (1207) is performed again to check if in the same disk drive there is still another initialization progress table which has not been checked yet. If the unique ID is correct and the initialization progress table is consistent with the CRC data (1215) which mean that the initialization progress table is correct and can be used, then checking if there exists a correct record of the initialization progress table (1220). If step (1220) is negative, the initialization progress table is stored (1225) as a correct record. If step (1220) is affirmative, which means that a correct record of the initialization progress table exists earlier, the sequential number of the new initialization progress table is checked to see if it is later than that of the record (1230). If step (1230) is affirmative, which means that the new initialization progress table is latter and newer, the record of the initialization progress table is updated (1235). If step (1230) is negative, which means that the new initialization progress table is older, and therefore the new initialization progress table is not used. Here, the sequential number is used to store the version of the initialization progress table and, for example, the latter the version is, the larger the sequential number is, and it incremented with each updated initialization progress table written into the member disks. Another example is a time stamp, which can also be used as the sequential number. When a correct initialization progress table record is created (1225) or after the correct record of the initialization progress table is updated (1235), step (1207) of checking if there is an initialization progress table which has not been checked is performed again.

Here, if step (1207) is negative, which means that all initialization progress tables of the member disk are detected, step (1205) is performed to check if there is still another member disk which has not been checked. If step (1205) is negative, which means that all member disks are checked, at this time, step (1255) of checking whether a correct record of an initialization progress table exists is performed. If step (1255) is affirmative, step (1260) shows that a correct initialization progress table is identified. If step (1255) is negative, in step (1270), it means that no correct initialization progress table is identified.

Although in embodiments of FIG. 2A through FIG. 2C, the consistency initialization comprises the consecutive consistency initialization and the induced consistency initialization, the consistency initialization can simply comprises the induced consistency initialization according to another embodiment of the present invention. In other words, only the data space corresponding to the host I/O is initialized, other data space is not. In addition, although in the above-mentioned embodiments of the present invention, the host I/O is often used as the I/O that accesses and induces the induced consistency initialization, whether the I/O is a host I/O is not the point. The point is, according to the induced consistency initialization of the present invention, when a RAID is completed with the RAID CREATE procedure, the RAID is allowed to be accessed by I/O and when a region accessed by an I/O is not performed regional consistency initialization, it will start regional consistency initialization on the associated region.

Those skilled in the art will readily observe that numerous modifications and alterations of the flow may be made while retaining the teachings of the invention. Accordingly, the above disclosure should be construed as limited only by the metes and bounds of the appended claims.

What is claimed is:

1. A method for initializing a plurality of physical storage devices (PSD) in a redundant array of independent disks (RAID) subsystem, the method comprising:

creating a RAID, including setting a RAID configuration of the RAID and creating a consistency initialization progress table for storing a plurality of consistency initialization states of a plurality of consistency initialization regions of the physical storage devices of the RAID subsystem; wherein the consistency initialization progress table includes a plurality of fields, and wherein one of the plurality of fields corresponds to one of the plurality of consistency initialization regions and said one of the plurality of fields includes a value for indicating the consistency initialization state of said one of the plurality of consistency initialization regions of the physical storage devices of the RAID subsystem, in which the consistency initialization state is a first consistency initialization state meaning that said one of the plurality of consistency initialization regions is completed with an induced regional consistency initialization, or is a second consistency initialization state meaning that said one of the plurality of consistency initialization regions is not completed with the induced regional consistency initialization, wherein after the consistency initialization progress table is created, the RAID subsystem is allowed to be accessed by a host I/O when there are still some of the consistency initialization regions not completed with the induced regional consistency initialization, wherein said induced regional consistency initialization makes data consistent with one another in the consistency initialization region of the physical storage devices of the RAID subsystem;

receiving the host I/O;

determining, after referring to the consistency initialization progress table, whether the consistency initialization region that is associated with the host I/O has been completed with the induced regional consistency initialization, so as to determine whether or not to trigger the induced regional consistency initialization on the consistency initialization region that is associated with the host I/O to define data of the consistency initialization region to a predetermined consistent state;

triggering by the host I/O, before executing an I/O access associated with the host I/O and after referring to the consistency initialization progress table where the consistency initialization progress table shows that the consistency initialization region which is associated with the host I/O has not been completed with the induced regional consistency initialization, is not being performed with the induced regional consistency initialization, and has not been started with the induced regional consistency initialization, the induced regional consistency initialization on the consistency initialization region which is associated with the host I/O to define data of the consistency initialization region to the predetermined consistent state, executing, after triggering the induced regional consistency initialization, the I/O access associated with the host I/O, and updating, after triggering the induced regional consistency initialization, a consistency initialization state of the consistency initialization region that is associated with the host I/O, into the consistency initialization progress table; and executing the I/O access associated with the host I/O on the consistency initialization region that is associated with the host I/O without first triggering the induced regional consistency initialization on the consistency initialization region that is associated with the host I/O, if the consistency initialization progress table shows that the consistency initialization region that is associated with the host I/O has been completed with the induced regional consistency initialization, after referring to the consistency initialization progress table.

2. The method of claim 1, wherein the RAID configuration is stored in a non-volatile memory device.

3. The method of claim 2, wherein the non-volatile memory device is a member physical storage device.

4. The method of claim 2, wherein there are a plurality of versions of the consistency initialization progress table stored in the non-volatile memory device.

5. The method of claim 2, wherein the memory device is a battery backed-up SRAM, a flash RAM or a disk drive except a member disk.

6. The method of claim 1, further comprising steps of:

receiving a second host I/O;

waiting for completion of the induced regional consistency initialization if the consistency initialization region has not been completed with the induced regional consistency initialization, and if the induced regional consistency initialization is being performed on the consistency initialization region that is associated with the second host I/O;

updating the consistency initialization state of the consistency initialization region, into the consistency initialization progress table; and writing the updated consistency initialization progress table into a non-volatile memory device.

7. The method of claim 6, wherein the host I/O accesses the RAID subsystem after the step of writing the updated consistency initialization progress table into the non-volatile memory device.

8. The method of claim 6, wherein the host I/O accesses the RAID subsystem before the step of writing the updated consistency initialization progress table into the non-volatile memory device.

9. The method of claim 1, further comprising a step of performing a consecutive regional consistency initialization on the consistency initialization regions that have not been started with the induced regional consistency initialization.

10. The method of claim 9, wherein the consecutive regional consistency initialization comprises steps of:

selecting, according to referring to the consistency initialization progress table, one of the consistency initialization regions;

performing the consecutive regional consistency initialization on the selected consistency initialization region if the selected consistency initialization region is not initialized and is not being initialized to define data of the consistency initialization region to the predetermined consistent state, and not performing the consecutive regional consistency initialization on the selected consistency initialization region if the selected consistency initialization region has already been initialized to define data of the consistency initialization region to the predetermined consistent state;

updating the consistency initialization state of the selected consistency initialization region, into the consistency initialization progress table after performing the consecutive regional consistency initialization on the selected consistency initialization region;

writing the updated consistency initialization progress table into a non-volatile memory device, when the consecutive regional consistency initialization is performed at a suitable time, wherein the suitable time is a timing when a predetermined number of consistency initialization regions have been completed with the consecutive regional consistency initialization, or when a predetermined time has elapsed after the consistency initialization progress table is stored in a member physical storage device; and repeating aforesaid steps until all consistency initialization regions have been initialized.

11. The method of claim 9, wherein the consecutive regional consistency initialization comprises steps of:

performing a regional initialization priority adjustment mechanism to select one of the consistency initialization regions which have not yet been initialized to define data of the consistency initialization region to the predetermined consistent state;

selecting one of the consistency initialization regions that have not yet been initialized to define data of the consistency initialization region to the predetermined consistent state;

performing the consecutive regional consistency initialization on the selected consistency initialization region if the induced regional consistency initialization is not being performed on the selected consistency initialization region;

updating the consistency initialization state of the selected consistency initialization region, into the consistency initialization progress table;

writing the updated consistency initialization progress table into a non-volatile memory device, when the consecutive regional consistency initialization is performed at a suitable time, wherein the suitable time is a timing when a predetermined number of consistency initialization regions have been initialized, when a predetermined percentage of the consistency initialization regions have been initialized, or when a predetermined time has elapsed after the consistency initialization progress table is stored in a member physical storage device; and repeating aforesaid steps until all consistency initialization regions have been initialized.

12. The method of claim 9, wherein the RAID subsystem is allowed host I/O accessing before the completion of consecutive regional consistency initialization.

13. The method of claim 10 further comprising, after all consistency initialization regions have been initialized, a step of: writing a state which shows that all consistency initialization regions have been initialized to define data of the consistency initialization region to the predetermined consistent state, into a non-volatile memory device.

14. The method of claim 1, further comprising a step of performing, anytime after the consistency initialization progress table is created, a consecutive regional consistency initialization on the consistency initialization regions that have not been initialized to define data of the consistency initialization region to the predetermined consistent state.

15. The method of claim 1, further comprising a step of dividing a data space of member physical storage devices into a plurality of consistency initialization regions.

16. The method of claim 1, further comprising a step of dividing a data space of member physical storage devices into a plurality of consistency initialization regions to be initialized to define data of the plurality of consistency initialization regions to the predetermined consistent state, and after the host I/O that induces the induced regional consistency initialization completes access to a data space of the RAID subsystem, the consistency initialization progress table is written into a non-volatile memory device, and then a host I/O result is returned.

17. The method of claim 1, further comprising a step of dividing a data space of member physical storage devices into a plurality of consistency initialization regions to be initialized to define data of the plurality of consistency initialization regions to the predetermined consistent state, and after the consistency initialization progress table is written into a non-volatile memory device, the host I/O accesses the data space of the RAID subsystem.

18. The method of claim 1, wherein if a member physical storage device has failed and is replaced by a new member physical storage device, and the new member physical storage device is used to perform a rebuilding of the RAID subsystem before the completion of the induced regional consistency initialization, according to referring to the consistency initialization progress table, the rebuilding only has to perform on the consistency initialization regions which have been initialized to define data of the consistency initialization regions to the predetermined consistent state, and the rebuilding does not have to perform on the consistency initialization regions which have not been initialized to define data of the consistency initialization regions to the predetermined consistent state.

19. The method of claim 1, wherein when receiving a second host I/O accessing the RAID subsystem, wherein the second host I/O is a read operation, and the consistency initialization region on the RAID subsystem to be accessed by the read operation has not been initialized to the predetermined consistent state, no induced regional consistency initialization is performed, and a value of zero or a predetermined value will be returned directly.

20. The method of claim 1, wherein when the RAID subsystem performs a host I/O operation and causes the induced regional consistency initialization, if the induced regional consistency initialization has been completed but the host I/O operation has not been completed while the consistency initialization progress table has been updated and written into member physical storage devices of the RAID subsystem, the updated consistency initialization progress table will not be written into the member physical storage devices again due to completion of the host I/O operation.

21. The method of claim 1, wherein the induced regional consistency initialization further comprises steps of:
detecting, when the RAID subsystem receives the host I/O, whether one of the consistency initialization regions that are associated with the host I/O has not been started with the induced regional consistency initialization; and
performing the induced regional consistency initialization on said consistency initialization region that is associated with the host I/O if said consistency initialization region that is associated with the host I/O has not been started with the induced regional consistency initialization.

22. The method of claim 21, further comprising a step of performing a consecutive regional consistency initialization on the consistency initialization regions that have not yet been initialized to define data of the consistency initialization region to a predetermined consistent state.

23. The method of claim 1, further comprising a step of performing, according to the consistency initialization progress table, a consecutive regional consistency initialization on the consistency initialization regions that have not yet been initialized to define data of the consistency initialization region to the predetermined consistent state.

24. The method of claim 1, wherein when receiving a second host I/O accessing the RAID subsystem, wherein the second host I/O is a read operation, if the consistency initialization region that is associated with the read operation has not been initialized to define data of the consistency initialization region to the predetermined consistent state, after the consistency initialization region that is associated with the read operation has been initialized to define data of the consistency initialization region to a predetermined consistent state, the read operation is performed.

25. The method of claim 1, wherein if the consistency initialization region that is associated with the host I/O for a write operation has not been initialized to define data of the consistency initialization region to the predetermined consistent state, after the consistency initialization region that is associated with the write operation has been initialized to define data of the consistency initialization region to the predetermined consistent state, the write operation is performed.

* * * * *